(12) United States Patent
Chandra et al.

(10) Patent No.: US 8,423,674 B2
(45) Date of Patent: Apr. 16, 2013

(54) METHOD AND APPARATUS FOR PROCESS SYNC RESTART

(75) Inventors: Ravi Chandra, Los Gatos, CA (US); Gerald Neufeld, Los Altos, CA (US); Jenny Yuan, San Jose, CA (US)

(73) Assignee: Ericsson AB, Stockholm (SE)

( * ) Notice: Subject to any disclaimer, the term of this patent is extended or adjusted under 35 U.S.C. 154(b) by 2047 days.

(21) Appl. No.: 09/872,920

(22) Filed: Jun. 2, 2001

(65) Prior Publication Data
US 2002/0199023 A1   Dec. 26, 2002

(51) Int. Cl.
*G06F 15/16*   (2006.01)
(52) U.S. Cl.
USPC .......................................... 709/248; 709/205
(58) Field of Classification Search .................. 709/248, 709/205; 719/313, 318
See application file for complete search history.

(56) References Cited

U.S. PATENT DOCUMENTS

| | | | |
|---|---|---|---|
| 4,325,120 A * | 4/1982 | Colley et al. .................. 711/202 |
| 4,847,749 A | 7/1989 | Collins et al. |
| 4,864,557 A * | 9/1989 | Morton et al. ................ 370/503 |
| 5,220,668 A | 6/1993 | Bullis |
| 5,230,051 A | 7/1993 | Quan |
| 5,301,309 A * | 4/1994 | Sugano ............................ 714/12 |
| 5,440,726 A * | 8/1995 | Fuchs et al. ....................... 714/20 |
| 5,748,882 A * | 5/1998 | Huang ............................. 714/47 |
| 5,774,717 A * | 6/1998 | Porcaro .......................... 707/202 |
| 5,838,659 A * | 11/1998 | Kainulainen ................. 370/216 |
| 5,907,701 A * | 5/1999 | Hanson .......................... 718/101 |
| 5,923,832 A * | 7/1999 | Shirakihara et al. ............. 714/37 |
| 5,938,775 A * | 8/1999 | Damani et al. .................. 714/15 |
| 5,956,719 A * | 9/1999 | Kudo et al. ....................... 707/10 |
| 5,978,933 A | 11/1999 | Wyld et al. |
| 5,991,794 A | 11/1999 | Hodges et al. |
| 6,012,150 A * | 1/2000 | Bartfai et al. ....................... 714/4 |
| 6,044,475 A * | 3/2000 | Chung et al. .................... 714/15 |
| 6,049,838 A * | 4/2000 | Miller et al. .................. 719/315 |
| 6,148,415 A * | 11/2000 | Kobayashi et al. ............. 714/15 |
| 6,178,522 B1* | 1/2001 | Zhou et al. ....................... 714/12 |
| 6,233,623 B1* | 5/2001 | Jeffords et al. ............... 719/316 |
| 6,292,905 B1* | 9/2001 | Wallach et al. .................... 714/4 |
| 6,370,656 B1* | 4/2002 | Olarig et al. ..................... 714/23 |
| 6,381,653 B1* | 4/2002 | Feray et al. .................. 719/315 |
| 6,393,582 B1* | 5/2002 | Klecka et al. ................... 714/11 |

(Continued)

FOREIGN PATENT DOCUMENTS

JP          08204823 A        8/1996
WO     PCT/US02/15322        3/2003

OTHER PUBLICATIONS

Heimbigner, Dennis. "The Process Wall: A Process State Server Approach to Process Programming." ACM. 1992.*
PCT/US02/15322 Search Report, mailed Jul. 22, 2002.

(Continued)

*Primary Examiner* — Kristie Shingles
(74) *Attorney, Agent, or Firm* — Blakely Sokoloff Taylor & Zafman, LLP

(57) ABSTRACT

A method and apparatus for process sync restart is described. A computer implemented method comprises receiving a first set of data from a network process, determining death of the network process, clearing the first set of data if a time period expires, and synchronizing the first set of data with a second set of data if the time period does not expire, the second set of data received from the network process after the network process restarts.

12 Claims, 15 Drawing Sheets

U.S. PATENT DOCUMENTS

| | | | |
|---|---|---|---|
| 6,401,216 B1 * | 6/2002 | Meth et al. | 714/16 |
| 6,405,262 B1 | 6/2002 | Vogel et al. | |
| 6,446,134 B1 * | 9/2002 | Nakamura | 719/313 |
| 6,463,446 B1 | 10/2002 | Wollrath et al. | |
| 6,477,663 B1 * | 11/2002 | Laranjeira et al. | 714/11 |
| 6,564,341 B1 * | 5/2003 | Sundaram et al. | 714/43 |
| 6,571,270 B1 * | 5/2003 | Lai et al. | 718/101 |
| 6,594,779 B1 * | 7/2003 | Chandra et al. | 714/15 |
| 6,598,094 B1 | 7/2003 | Wollrath et al. | |
| 6,647,432 B1 | 11/2003 | Ahmed et al. | |
| 6,651,185 B1 * | 11/2003 | Sauvage | 714/15 |
| 6,654,948 B1 | 11/2003 | Konuru et al. | |
| 6,681,389 B1 * | 1/2004 | Engel et al. | 717/173 |
| 6,684,396 B1 * | 1/2004 | Brittain et al. | 717/168 |
| 6,694,450 B1 * | 2/2004 | Kidder et al. | 714/15 |
| 6,718,376 B1 | 4/2004 | Chu et al. | |
| 6,721,898 B1 | 4/2004 | Hasha | |
| 6,721,907 B2 | 4/2004 | Earl | |
| 6,763,384 B1 | 7/2004 | Gupta et al. | |
| 6,792,604 B1 * | 9/2004 | Hickson et al. | 719/312 |
| 6,823,474 B2 * | 11/2004 | Kampe et al. | 714/13 |
| 6,834,326 B1 * | 12/2004 | Wang et al. | 711/114 |
| 6,876,625 B1 * | 4/2005 | McAllister et al. | 370/221 |
| 6,907,605 B1 * | 6/2005 | Ault et al. | 718/100 |
| 6,973,023 B1 * | 12/2005 | Saleh et al. | 370/217 |
| 6,983,317 B1 * | 1/2006 | Bishop et al. | 709/223 |
| 2002/0049776 A1 * | 4/2002 | Aronoff et al. | 707/200 |

OTHER PUBLICATIONS

Larry Wall et al., "Programming Perl", Sep. 1996, pp. 337-355, O'Reilly and Associates, Sebastopol, California.

Aeleen Frisch, Essential System Administration, Sep. 1995, pp. 41-50, O'Reilly and Associates, Sebastopol, California.

Heimbigner, Dennis et al., "Software Environments in Support of Wide-Area Development Final Report.", Dec. 26, 2000, pp. 85 total.

* cited by examiner

METHOD AND APPARATUS FOR PROCESS SYNC RESTART

BACKGROUND OF THE INVENTION

1. Field of the Invention

The invention relates to the field of networks. More specifically, the invention relates to network elements.

2. Background of the Invention

A network element hosts multiple processes to maintain data for network communication. These processes relay information to each other with inter-process communication (IPC). The middleware of the network element will maintain process identification numbers for the processes running on the network element. One process will communicate directly with another process using these process identification numbers. Often within a network element, multiple processors run different operating systems.

If a process wants to communicate with a process that is dead, the process continues passing requests to the dead process. The requesting process detects the failure of the dead process through a response to the request or via timeouts. Although the operating system can detect when a process dies, it does not immediately communicate state of the process to other processes.

One method of IPC utilizes heartbeat messaging between processes. Once communication is established between two processes on a network element, the two processes periodically transmit heartbeat messages or signals indicating that they are alive and running. Death of one of the processes is detected by the other process when a heartbeat message has not been received within a given time period. Once a process is dead, however, the living process is ignorant of the dead process restarting. In addition, if both communicating processes die, when they restart different scenarios can occur. If both processes restart within the same time period, then they will both send requests. If one process restarts while the other remains dead, then the requesting process will repeatedly transmit requests to the dead process until it restarts.

Processes communicate with each other to disseminate information. One process on a network element may gather information about the interfaces of the network element while another process gathers routing information. This information is exchanged and/or passed on to other processes to facilitate processing and transmission of network traffic.

When a process requires information from another process, the process will send an IPC message to the other process requesting information or data. The other process will then pass a response back to the requesting process with the requested data.

If a requesting process does not receive a response within a certain time period, then the requesting process will mark the data from the timed out process as stale. Since the requesting process is unaware of the state of the timed out process, it sets a long timer on the stale data. When the timer expires, the stale data is removed.

Unfortunately, without information about the state of the timed out process, the requesting process cannot function intelligently. The stale data may be used beyond its life. Traffic processed with the stale data may be dropped or delayed. The length of time the data should be considered stale begins at some point before the timeout until the time expires. The amount of traffic impacted increases in proportion to this length of time.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

The Process State Manager

Figure 1:
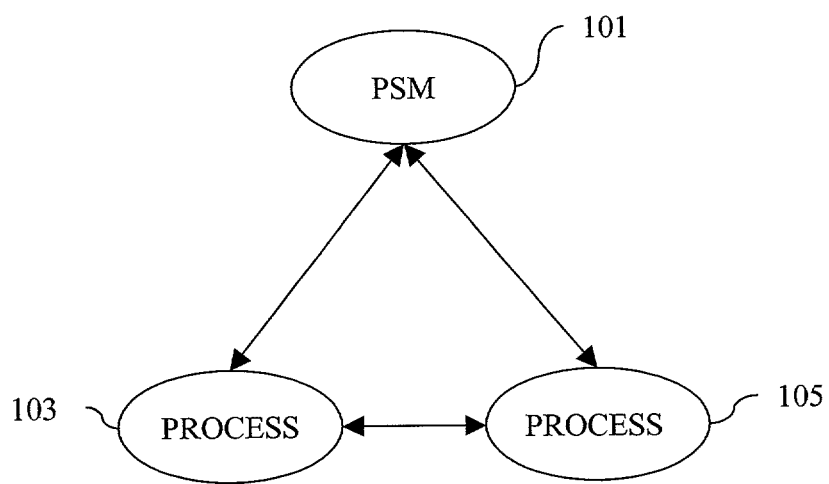
FIG. 1 is an exemplary diagram illustrating inter-process communication according to one embodiment of the invention.

FIG. 1 is an exemplary diagram illustrating inter-process communication according to one embodiment of the invention. In FIG. 1, a process state manager (PSM) 101 communicates with a process 103 and a process 105. The PSM 101 provides communication keys to the processes 103 and 105 when they register with the PSM 101. With the communication keys, the processes 103 and 105 communicate with each other. The process 103 requests a communication key from the PSM 101 whenever the process 103 starts and restarts. In general, process 103 and 105 exist on different processors using different operating systems. The process 105 also requests a communication key from the PSM 101 whenever it starts and restarts.

Assuming the process 103 is interested in the process 105, the process 103 registers interest in the process 105 with the PSM 101 by sending a lookup request to the PSM 101. The lookup request can identify the process 105 by a symbolic name, an identifier provided by the process 105. After the process 105 has registered with the PSM 101 and the process 103 registers interest of process 105 with the PSM 101, the PSM 101 passes process 105's communication key to process 103. If the process 105 has not registered with the PSM 101, then the process 103 waits until the process 105 registers with the PSM 101 or polls the PSM 101 for the process 105's communication key. The process 103 uses the communication key for inter-process communication (IPC) with the process 105. The process 105 will compare the communication key transmitted by process 103 with its communication key. If the keys do not match, then process 105 rejects messages from process 103.

The communication key includes a process identifier and an incarnation identifier. The process identifier is unique for each process registered with the PSM 101. The unique process identifier identifies a process. The incarnation identifier indicates an incarnation or version of the process. When a process first starts, its incarnation identifier is an initial value. Each time the process restarts, its incarnation identifier is updated to reflect the new version or incarnation.

Figure 2:
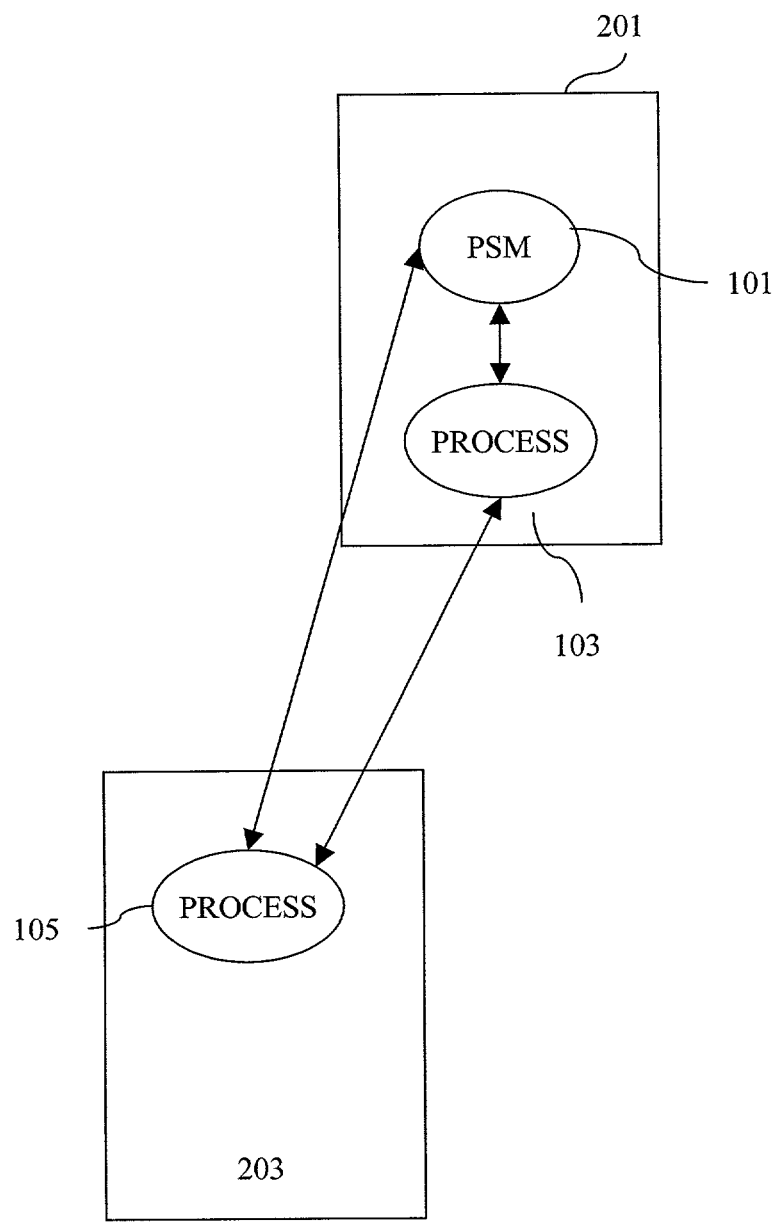
FIG. 2 is an exemplary diagram illustrating inter-process communication among network elements according to one embodiment of the invention.

FIG. 2 is an exemplary diagram illustrating inter-process communication between processors according to one embodiment of the invention. In FIG. 2, a processor 201 hosts the PSM 101 and the process 103. The process 103 communicates with the process 105. The process 105 is running on a processor 203. The process 105 registers and communicates with the PSM 101. The process 105 also communicates with the process 103. Since the process 105 is on the non-PSM processor 203, the process 105 transmits signals indicating that it is running (i.e. heartbeat messages or breath of life messages). If the PSM 101 does not receive a heartbeat message within a defined time period, then the PSM 101 considers the process as dead.

For example, if the process 105 dies, then it will no longer transmit heartbeat messages to the PSM 101. The PSM marks the process 105 as dead when the defined time period for receiving a heartbeat message from the process 105 expires. Since the processes 103 is interested in the process 105, the PSM 101 will transmit a death notification to the interested process 103. With this information, the process 103 can function intelligently and perform other tasks without expending time attempting communication with the dead process 105. When the process 105 restarts, it will request a communication key from the PSM 101. The PSM 101 will find the already created process identifier for process 105 and update the incarnation identifier for the process 105 to indicate the new incarnation. After updating the incarnation identifier, the PSM 101 transmits the new communication key to the process 105. The PSM 101 then transmits the new communication key for process 105 to the interested process 103. Process 103 receives the new communication key for process 105 asynchronously. Once received, the process 103 can begin communication with process 105.

In one embodiment of the invention, the process 103 also transmits heartbeat messages to the PSM 101. In another embodiment of the invention, an operating system running on the processor 201 determines when the process 103 dies. If the process 103 dies, then the operating system will notify the PSM 101 of process 103 dying.

The described embodiments of the invention provide intelligence to processes. Processes can efficiently and intelligently perform tasks with knowledge of which processes are available for communication. A process does not expend time attempting to establish communications with a dead process. Instead, the process can complete other tasks until the dead process restarts.

Figure 3:
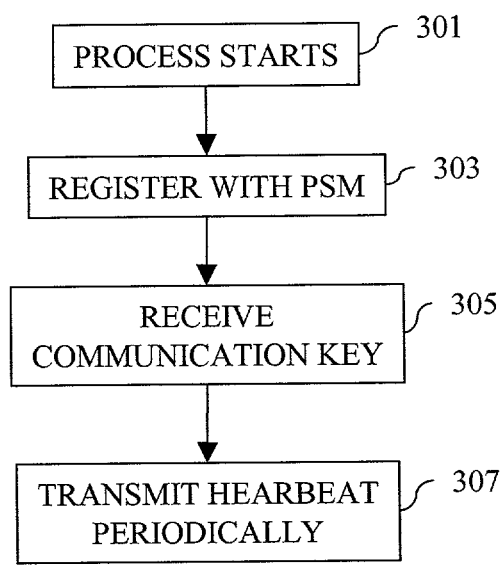
FIG. 3 is a flowchart for a process to register with the process state manager according to one embodiment of the invention.

FIG. 3 is a flowchart for a process to register with the process state manager according to one embodiment of the invention. At block 301, a process starts. At block 303, the process transmits a register request to the PSM. At block 305, the process receives a communication key from the PSM. At block 307, the process begins to periodically transmit heartbeat messages to the PSM. In one embodiment of the invention, the process runs on the same processor as the PSM and does not transmit heartbeat messages.

Figure 4:
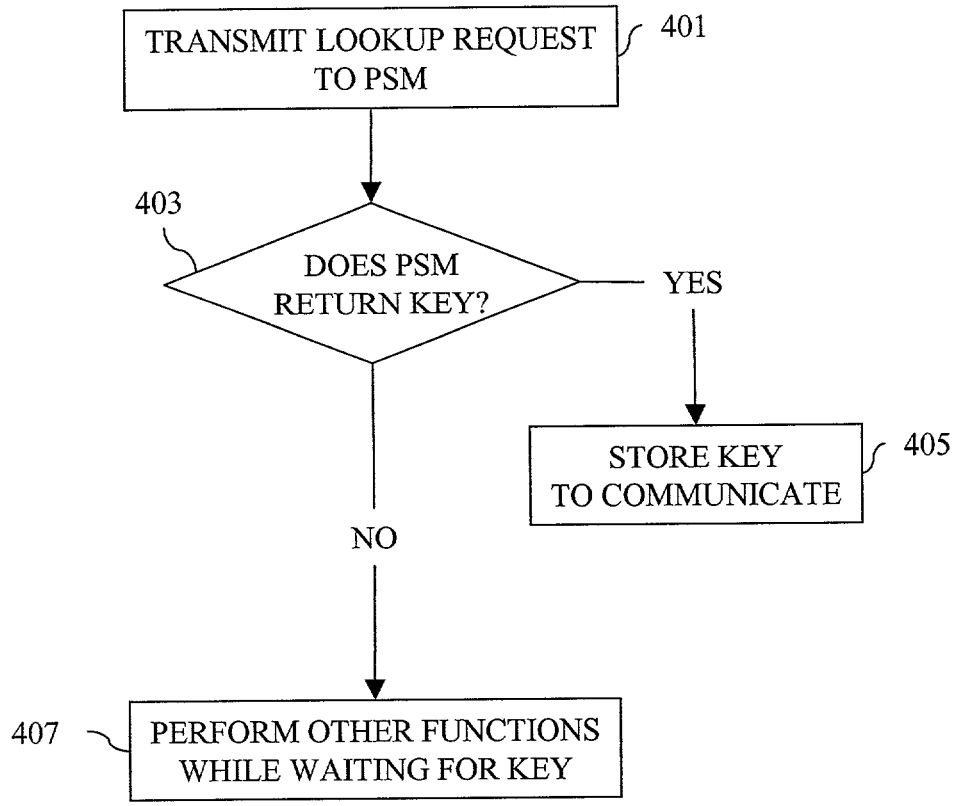
FIG. 4 is a flowchart for performing a lookup request according to one embodiment of the invention.

FIG. 4 is a flowchart for performing a lookup request according to one embodiment of the invention. At block 401, a process transmits a lookup request of a process to the PSM. At block 403, the process determines if the PSM returns a communication key for the requested process. If the PSM returns a communication key to the requesting process, then at block 405 the requesting process uses the key to communicate with the requested process. If a communication key is not returned by the PSM at block 403, then at block 407 the requesting process performs other functions while waiting for the PSM to transmit the requested communication key. In another embodiment of the invention, the requesting process polls the PSM until the requested key is received.

Figure 5:
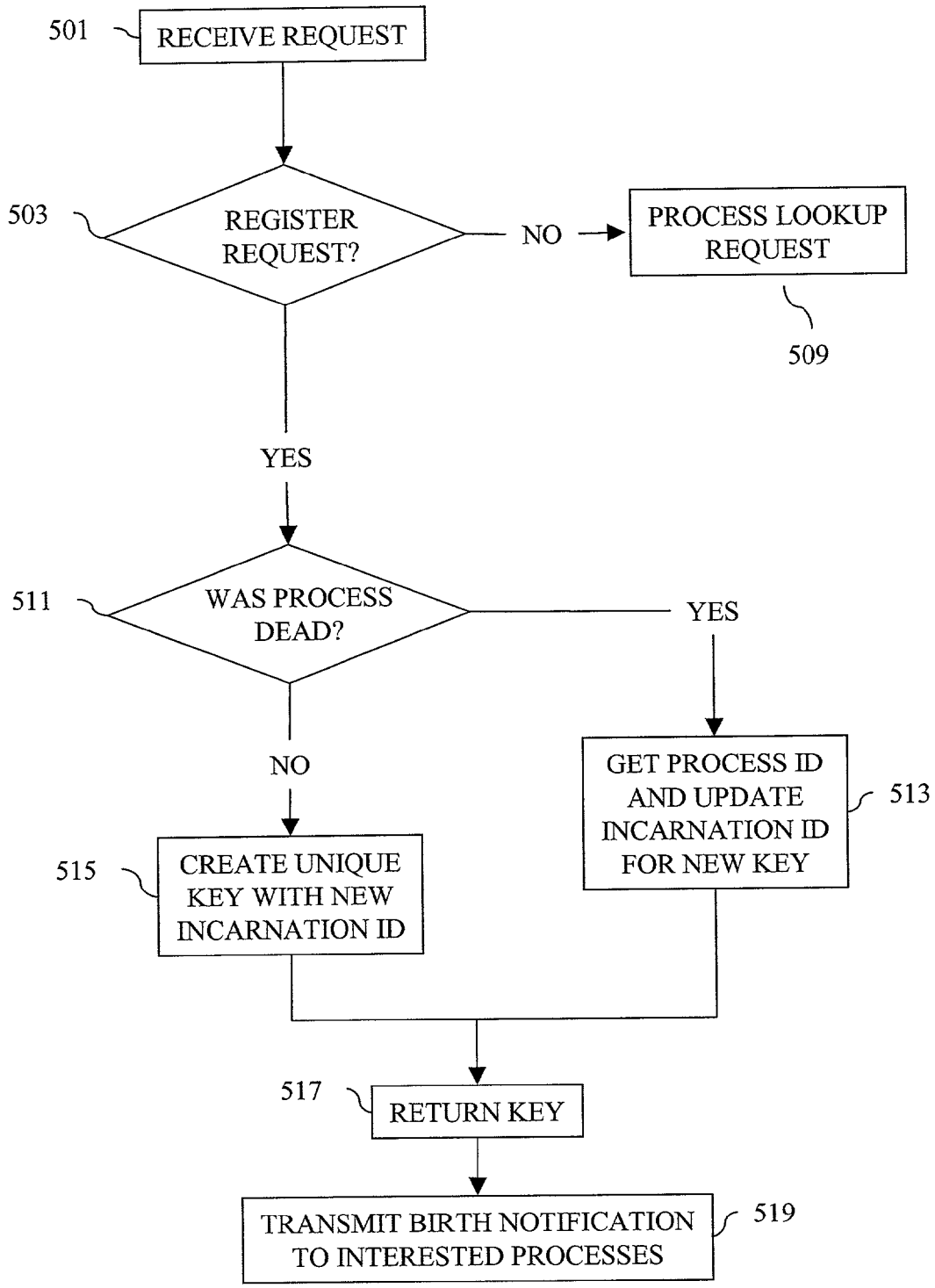
FIG. 5 is a flowchart for the process state manager to process requests according to one embodiment of the invention.

FIG. 5 is a flowchart for the process state manager to process requests according to one embodiment of the invention. At block 501, the PSM receives a request. At block 503, the PSM determines if the received request is a register request. If the received request is not a register request, then at block 509 the lookup request is processed.

If the PSM determines the received request to be a register request at block 503, then at block 511 the PSM determines if the requesting process was dead. If the requesting process was not dead (i.e., the requesting process has previously registered, then the PSM creates a unique process identifier and a new incarnation identifier for a communication key at block 515. Control flows from block 515 to block 517. If the requesting process was dead, then at block 513 the PSM uses the process identifier for the requesting process and updates the requesting process' incarnation identifier to create a new communication key. At block 517, the PSM transmits the communication key to the requesting process. At block 519, the PSM transmits a birth notification indicating the new communication key to processes interested in the requesting process.

Figure 6:
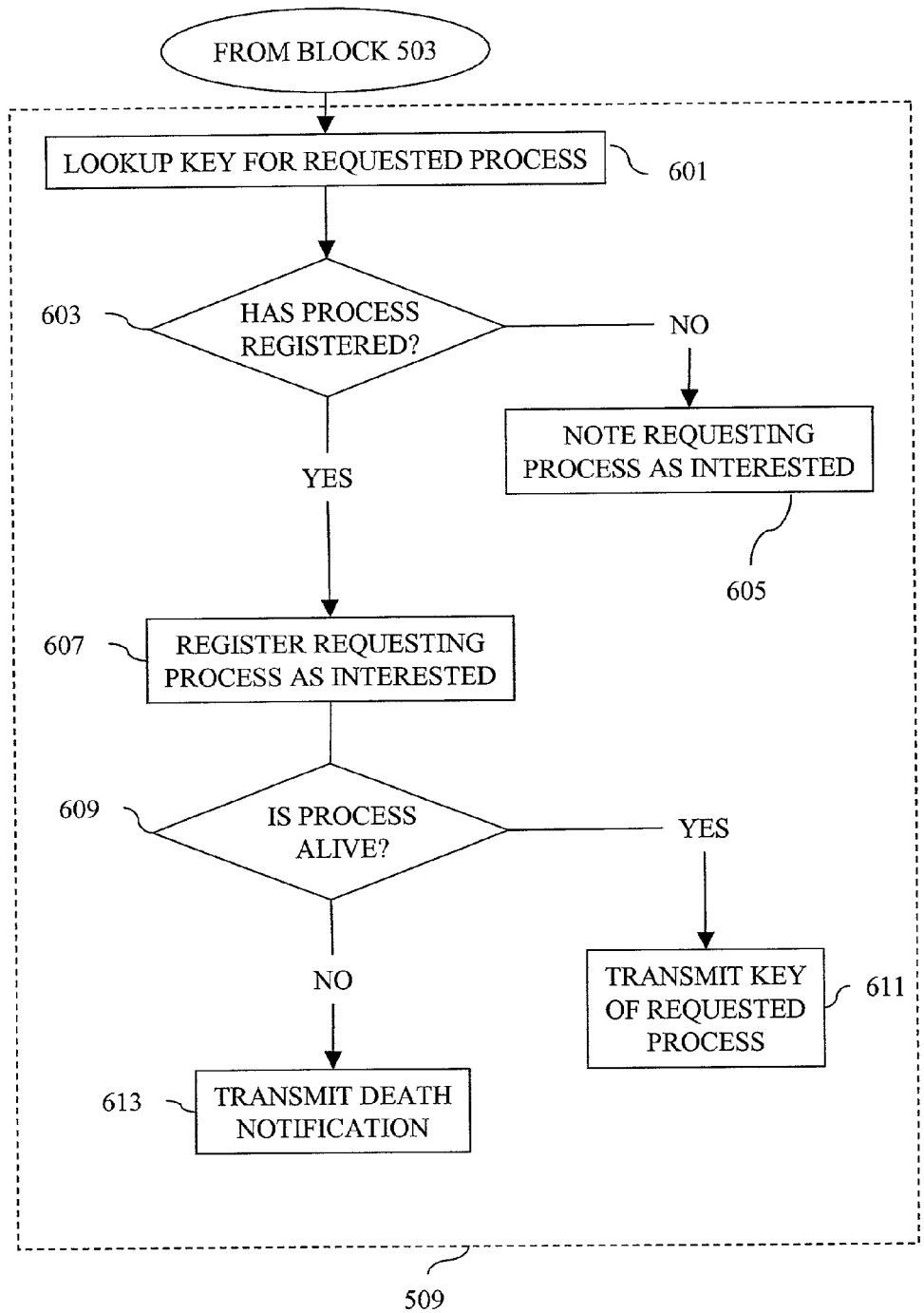
FIG. 6 is a flowchart for processing a lookup request according to one embodiment of the invention.

FIG. 6 is a flowchart for processing a lookup request indicated in block 509 of FIG. 5 according to one embodiment of the invention. At block 601, the PSM performs a lookup of the requested process. In one embodiment of the invention, the lookup request includes the string name of the requested process. In another embodiment of the invention, the lookup request includes an identifier for the process provided by the operating system in combination with a value identifying the hosting network element. At block 603, it is determined if the requested process has registered with the PSM. If the requested process has not registered with the PSM, then at block 605 the PSM notes the requesting process as an interested process of the requested process. If the PSM finds the requested process, then at block 607 the PSM registers the requesting process as an interested process for the requested process. At block 609, the PSM determines if the requested process is alive. If the process is alive, then at block 611 the PSM transmits the communication key for the requested process to the requesting process. If the requested process is dead, then at block 613, the PSM transmits a death notification to the requesting process.

Figure 7A:
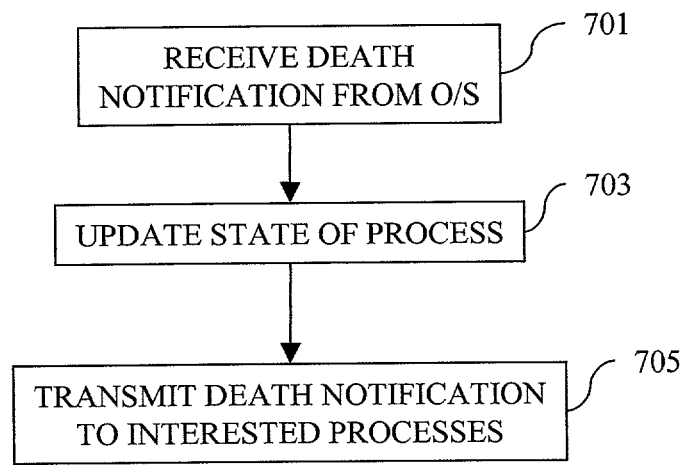
FIG. 7A is a flowchart for determining death of a process on the same network element as the PSM according to one embodiment of the invention.
Figure 7B:
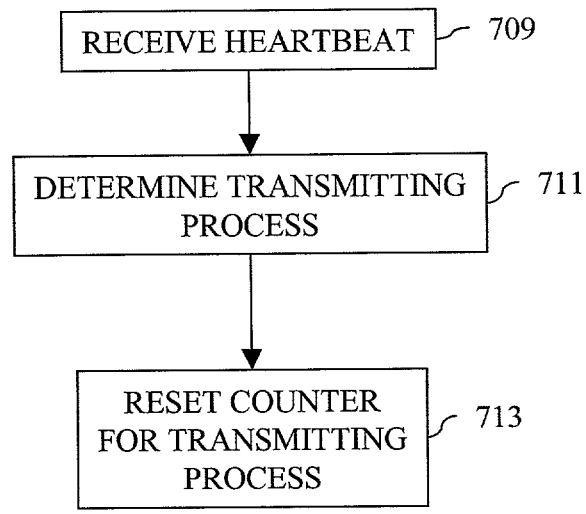
FIG. 7B is a flowchart for the process state manager to process heartbeat messages according to one embodiment of the invention.
Figure 7C:
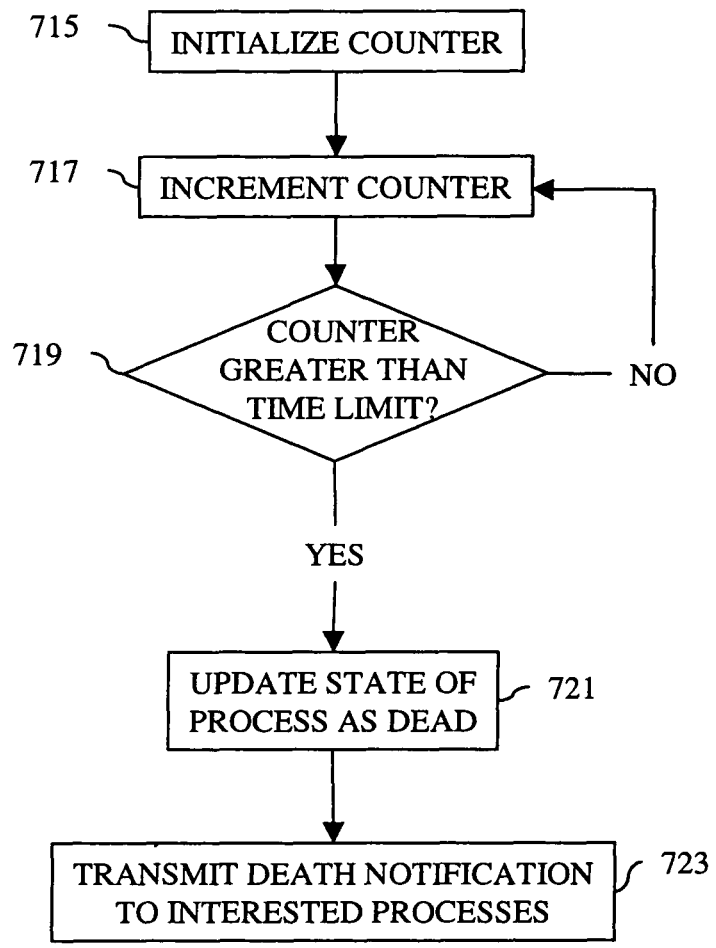
FIG. 7C is a flowchart for the process state manager to determine death of a process according to one embodiment of the invention.

FIGS. 7A-7C are flowcharts for the PSM to determine death of a process according to one embodiment of the invention. FIG. 7A is a flowchart for determining death of a process on the same network element as the PSM according to one embodiment of the invention. At block 701, the PSM uses the operating system to determine death of a process. In one embodiment of the invention, the PSM watches for the operating system to generate error codes for processes. The PSM determines which process has died from the error code. In another embodiment of the invention, the PSM periodically queries the operating system for currently active processes. The PSM determines processes to be dead when they are no longer listed as active by the operating system. At block 703, the PSM updates the state of the process to indicate death. At block 705, the PSM transmits a death notification to the interested processes registered for the dead process.

FIG. 7B is a flowchart for the process state manager to process heartbeat messages according to one embodiment of the invention. At block 709, the PSM receives a heartbeat message. At block 711, the PSM determines which process transmitted the heartbeat message. At block 713, the PSM resets a counter for the transmitting process.

FIG. 7C is a flowchart for the process state manager to determine death of a process according to one embodiment of the invention. At block 715, the PSM initializes a counter for a registering process. At block 717, the PSM increments the counter. At block 719, the PSM determines if the counter has exceeded a limit for receiving heartbeats from the process. If the limit has not been exceeded, then control flows back to block 717. If the limit has been exceeded, then at block 721 the PSM updates the state of the process to indicate dead. At block 723, the PSM transmits a death notification to processes interested in the dead process. In another embodiment of the invention, the PSM transmits a message to a process exceeding the time limit. If the process responds, then the counter is reset as if a heartbeat message has been received.

Figure 8:
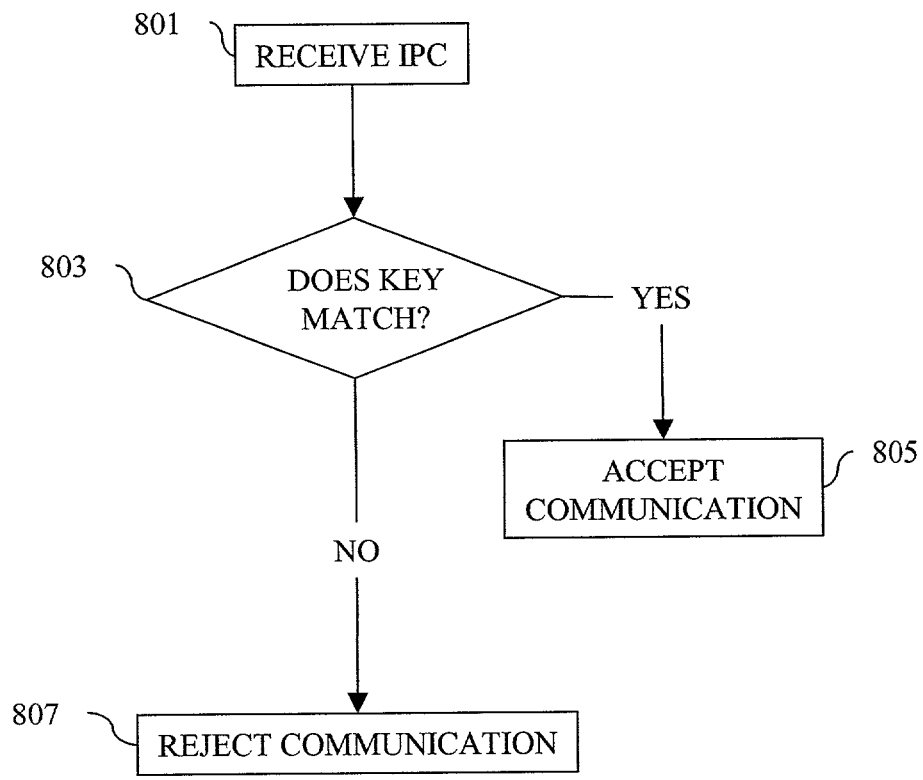
FIG. 8 is a flowchart for attempting inter-process communication according to one embodiment of the invention.

FIG. 8 is a flowchart for inter-process communication according to one embodiment of the invention. At block 801, a process receives an IPC message. At block 803, the receiving process determines if the communication key included in the IPC message matches the receiving process' communication key. If the keys match, then at block 805, the receiving process accepts communication with the transmitting process. If the keys do not match, then the receiving process rejects communications from the transmitting process at block 807. In one embodiment of the invention, the transmitting process transmits a lookup request to the PSM in response to the rejected communication.

As stated above, the described embodiments of the invention provide intelligence to processes. With this intelligence, processes can performs tasks efficiently. In addition, the incarnation identifier of the communication key provides intelligence of a process restarting. A process may have a different task set upon determining another communication has restarted. For example, an interested process may request a refresh of data from the restarted process.

Process Sync Restart

Figure 9:
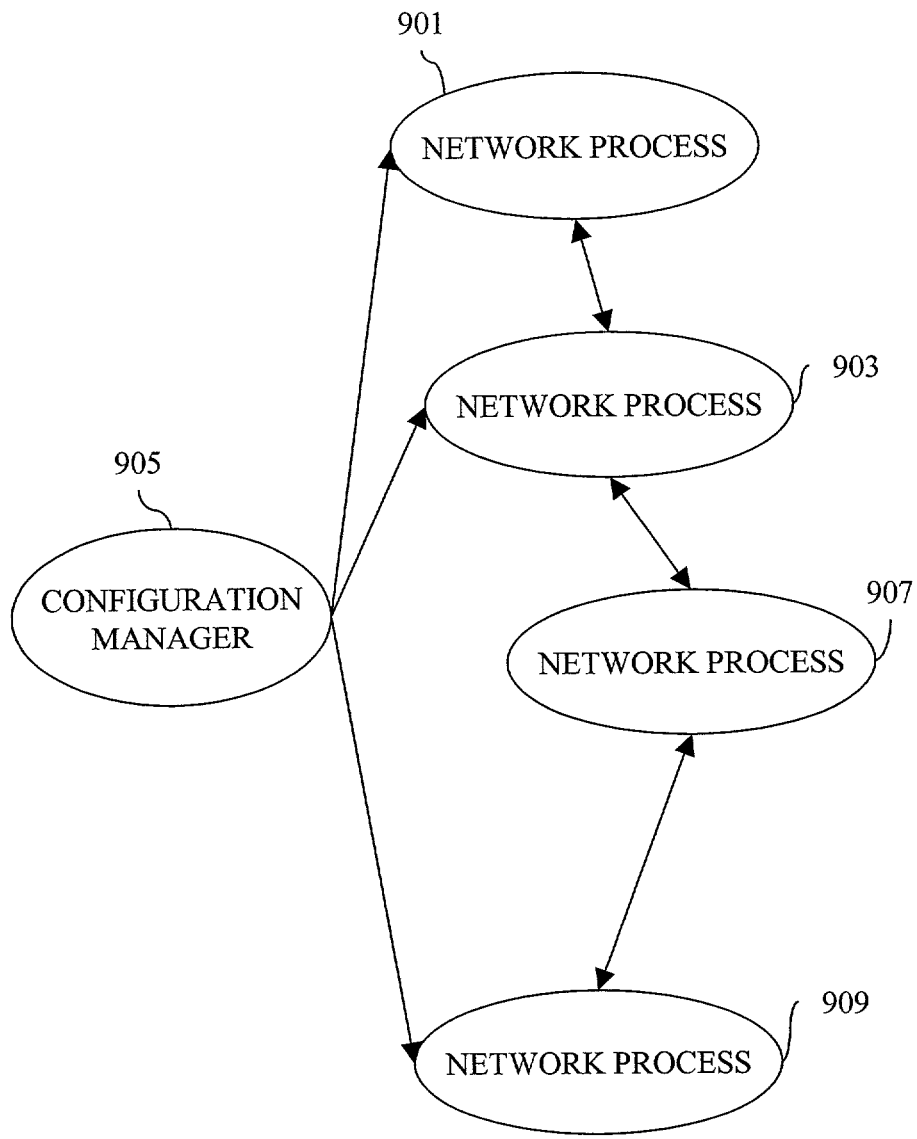
FIG. 9 is an exemplary diagram of process interaction according to one embodiment of the invention.

FIG. 9 is an exemplary diagram of process interaction according to one embodiment of the invention. In FIG. 9, a configuration manager 905 communicates with 3 network processes 901, 903, and 909. The configuration manager 905 sends configuration information to the network processes 901, 903, and 909. In the example illustrated by FIG. 9, the network process 901 communicates with the network process 903. The network process 903 communicates with the network process 907. The network process 909 also communicates with the network process 907. Each of the network processes 901, 903, 907, and 909 gather or discover information and generate data corresponding to the discovered information. For example, if the network process 903 is an interface state manager, then the network process 903 would discover the states of the interfaces of the hosting network element (e.g., up, down, cable connected, etc.) and communicate those states to other network processes. If the network process 903 is a Border Gateway Protocol (BGP) process, then the network process 903 would gather routing information and communicate that information to other network processes, such as the network process 907.

As an illustration, assume the network process 901 discovers 3 interfaces on its host network element: interface 1, interface 2, and interface 3. The network process 901 determines that all 3 interfaces are up and have cables connected. The network process 901 communicates this information to the network process 903. The network processes 903 stores this information from the network process 901 and uses it to determine routing information. The network process 903 determines the routing information as indicated in Table 1.

TABLE 1

| Exemplary Routing Information | |
|---|---|
| Destination Address | Interface |
| 1.1.1.1 | 1 |
| 2.2.2.2 | 2 |
| 3.3.3.3 | 3 |

The network process 901 dies and restarts. The network process 901 discovers that the interface 2 is down, but discovers an interface 4 is up and has a cable connected. The network process 901 communicates this new information to the network process 903. The network process 903 synchronizes this new information with the stored information. The network process 903 then modifies its routing information as indicated in Table 2.

TABLE 2

| Updated Exemplary Routing Information | |
|---|---|
| Destination Address | Interface |
| 1.1.1.1 | 1 |
| 3.3.3.3 | 3 |
| 4.4.4.4 | 4 |

The change in information ripples through the communicating network processes. The network process 907 previously stored the information shown in Table 1. The network process 907 will receive the information shown in Table 2 from the network process 903. When the network process 907 synchronizes the two sets of data, the absence of information for 2.2.2.2 implies that it should be removed. The network process 909 transmits data using the information from the network process 907. Although some traffic transmitted to 2.2.2.2 may be lost because the interface 2 goes down, the network process 909 can still transmit traffic to 1.1.1.1 and 3.3.3.3 despite the death of the network process 901. In addition, if the network process 903 dies, the network process can still transmit traffic without interruption. The described mechanism for seamlessly synchronizing data from restarted processes avoids service delay and service interruption typically caused by internal errors. Hence, the described invention increases robustness and reliability of a network element.

Figure 10:
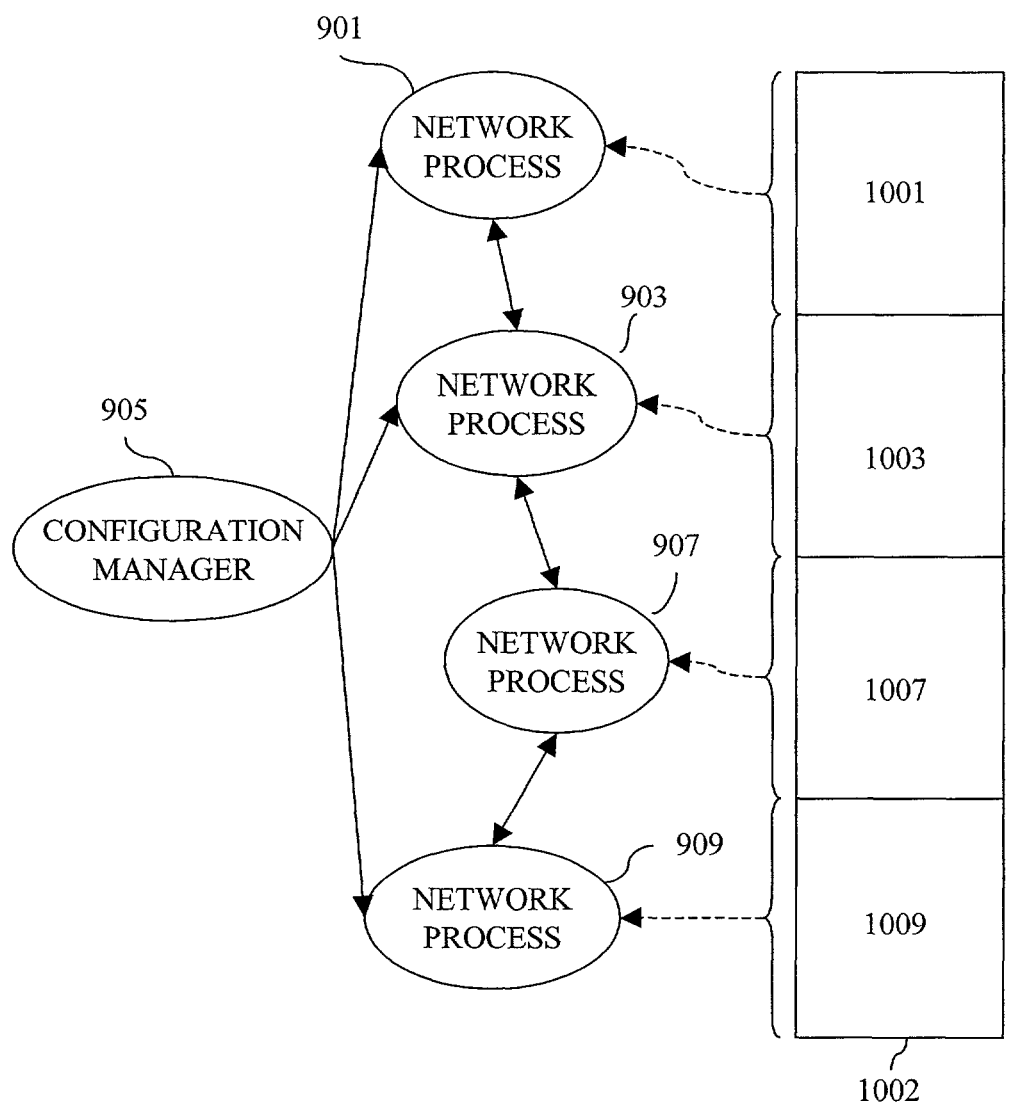
FIG. 10 is a diagram of the processes illustrated in FIG. 9 and their locations in memory according to one embodiment of the invention.

FIG. 10 is a diagram of the processes illustrated in FIG. 9 and their locations in memory according to one embodiment of the invention. Although the memory area of the memory 1002 for each process is equal in FIG. 10, each process may use or be provisioned a different amount of memory. Furthermore, each of the areas of memory 1001, 1003, 1007, and 1009 are shown as a single segment of the memory 1002, but multiple words or segments of the memory 1002 may comprise each area. In FIG. 10, the network processes 901, 903, 907, and 909 each use respectively the areas of memory 1001, 1003, 1007, and 1009.

Referring to the example described above, the information gathered by the network process 901 is stored in its memory area 1001. The information gathered by the network process 903 is stored in the area of memory 1003. Since the network process 903 has requested information from the network process 901, information gathered by the network process 901 is also stored in the area of memory 1001. The network process 907 stores information from the network process 903 in the area of memory 1007. Therefore, referring the to above described example, interface information is stored in the areas of memory 1001, 1003 and 1007. If the network process 909 requests interface information, then interface information will also be stored in the area of memory 1009. Routing information collected by the network process 903 will be stored in the area of memory 1001, 1003, and possibly 1009 if the network process 909 requests such information from the network process 903 directly or via the network process 907. In another embodiment of the invention, the memory 1002 is multiple memories.

Figure 11:
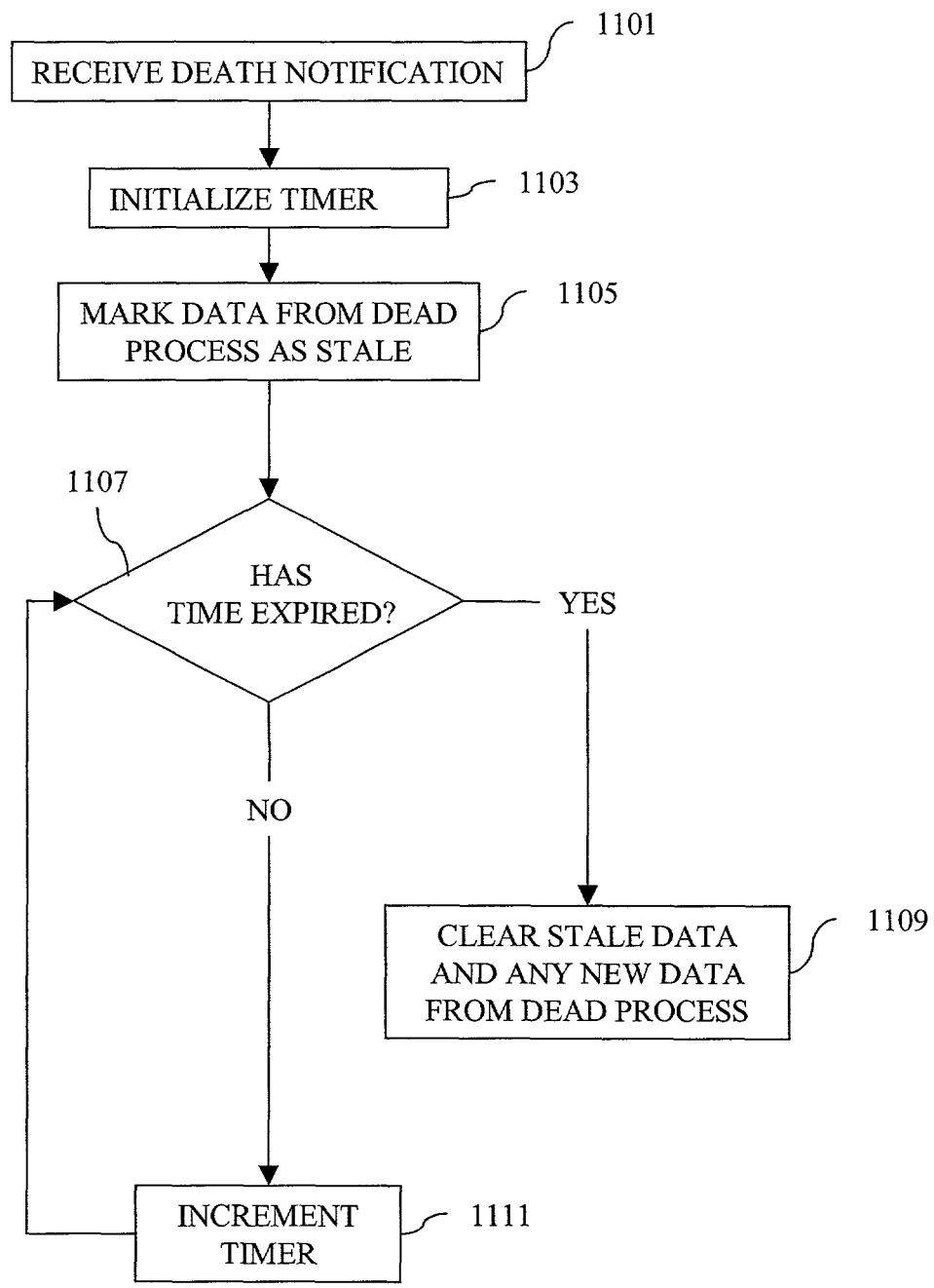
FIG. 11 is a flowchart for limiting stale data according to one embodiment of the invention.

FIG. 11 is a flowchart for limiting stale data according to one embodiment of the invention. FIG. 11 will be described with reference to the previously described example and FIG. 9. At block 1101, the network process 903 receives a death notification for the network process 901. At block 1103, the network process 903 initializes a timer. At block 1105, the network process 903 indicates all data from the network process 901 as stale. At block 1107, the network process 903 determines if the timer is greater than or equal to a time limit. If the time has expired, then at block 1109, the network process 903 clears stale data from the network process 901 and any new data received from the network process 901. If the time has not expired, then at block 1111 the timer is incremented and control flows back to block 1107. Limiting the life of stale data prevents magnifying effects of data that may be causing the originating process to repeatedly die or loop.

Figure 12:
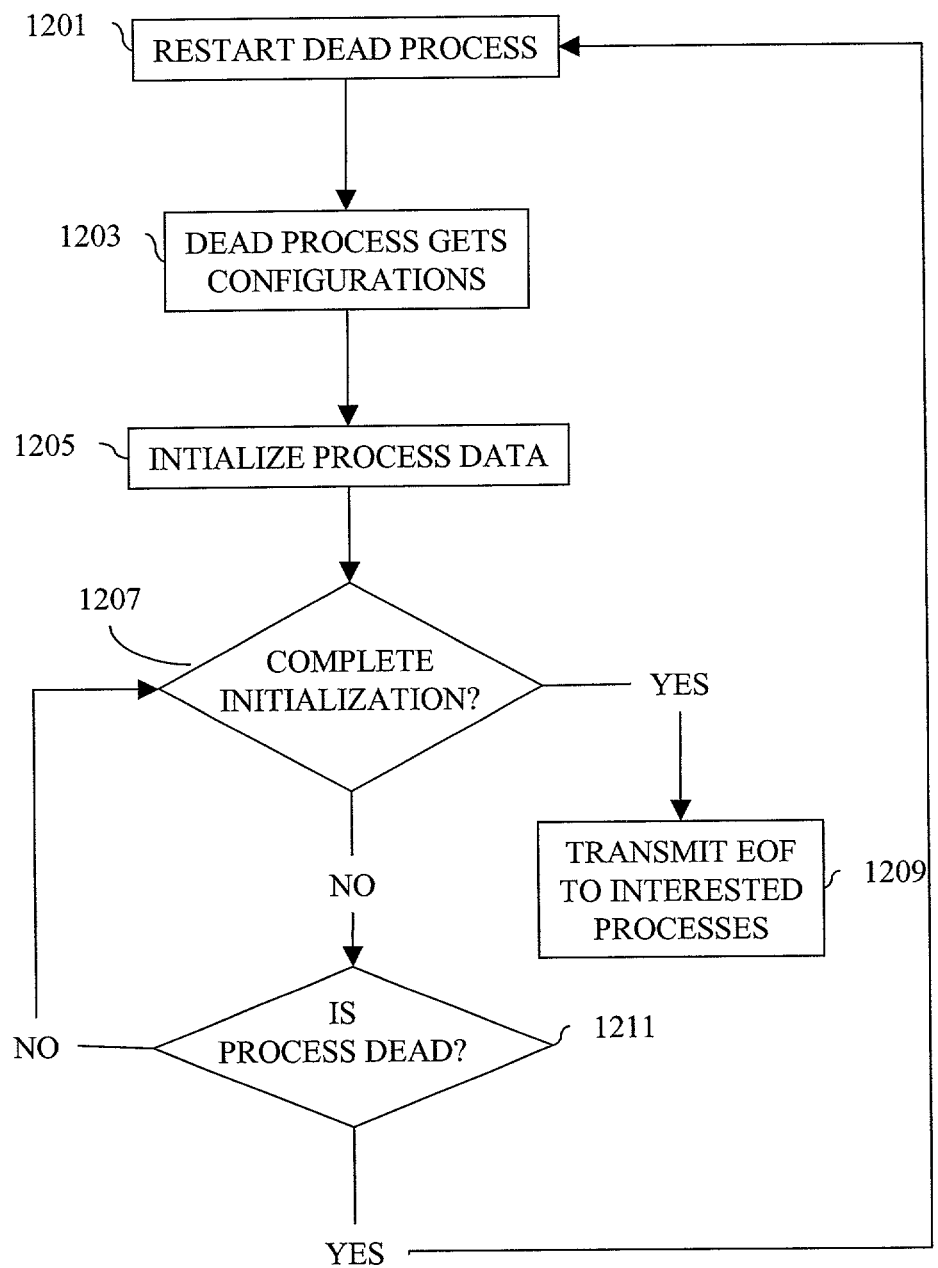
FIG. 12 is a flowchart of initialization for a restarted process according to one embodiment of the invention.

FIG. 12 is a flowchart of initialization for a restarted process according to one embodiment of the invention. FIG. 12 will be described with reference to the previously described example and FIG. 9. At block 1201, the dead network process 901 is restarted. At block 1203, the network process 901 gets configurations from the configuration manager 905. At block 1205, the network process initializes data (i.e., discovers state of interfaces). At block 1207, the network process 901 determines if it has completed initialization. If the network process 901 has completed initialization, then at block 1209 the network process 901 transmits an EOF or signal indicating completion (done signal) to the network process 903. If the initialization is not complete, then at block 1211 it is determined if the process has died again. If the process has not died again, then control flows to block 1207. If the network process 901 has died again, then control loops back to block 1201.

Figure 13:
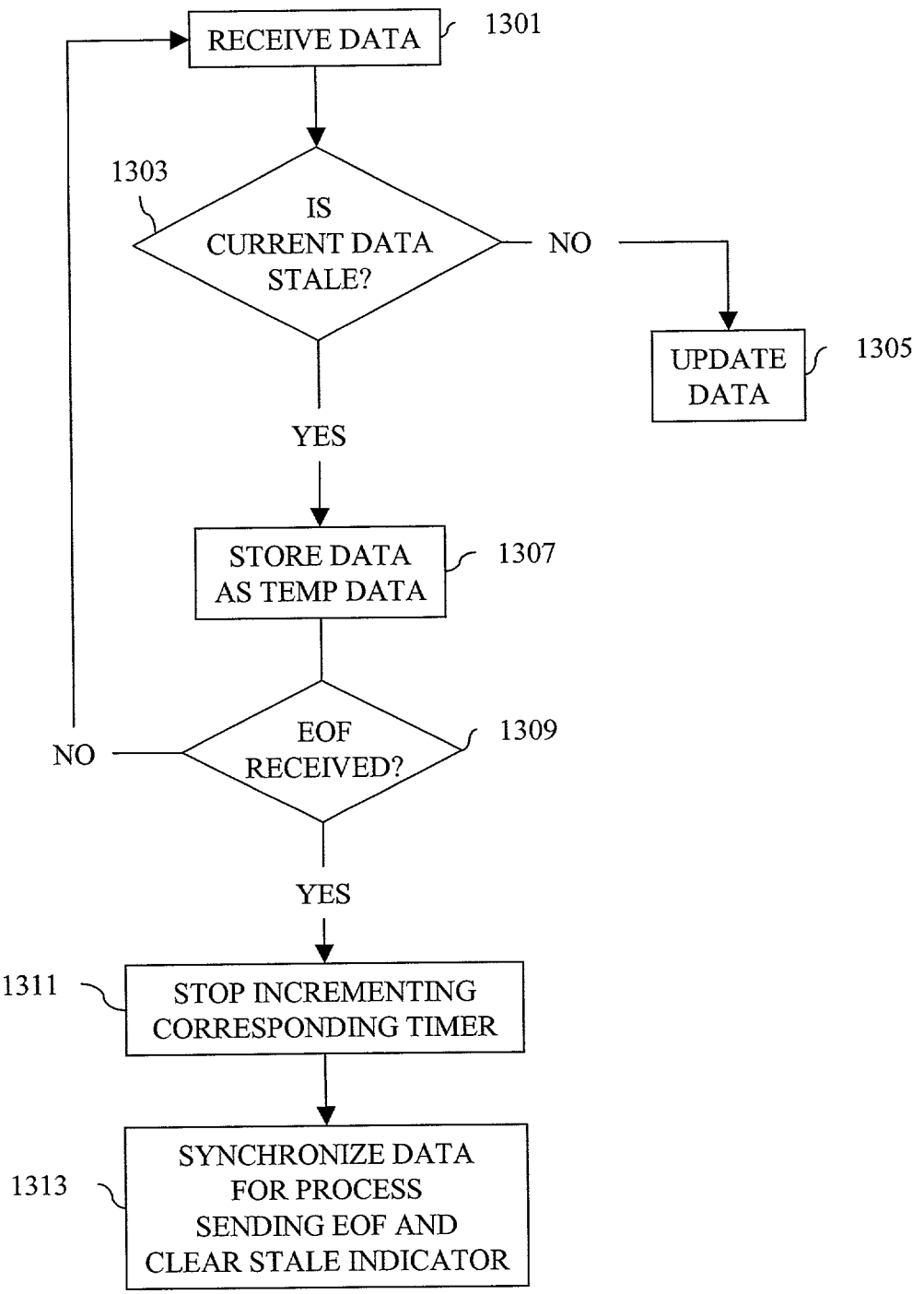
FIG. 13 is a flowchart for synchronization of data according to one embodiment of the invention.

FIG. 13 is a flowchart for synchronization of data according to one embodiment of the invention. FIG. 13 will be described with reference to the previously described example and FIG. 9. At block 1301, the network process 903 receives data from the network process 901. At block 1303, the network process 903 determines if data it currently has from the network process 901 is stale. If the current data is not stale, then at block 1305 the network process 903 updates the network process 901 data. If the data is marked as stale, then at block 1307 the network process 903 stores the received data as temporary data. At block 1309, the network process 903 determines if it has received an EOF or done signal from the network process 901. If the network process 903 has not received the EOF, then control loops back to block 1301. If the network process 903 receives the EOF from the network process 901, then at block 1311 the network process 903 stops incrementing the timer corresponding to the network process 901. At block 1313, the network process 903 synchronizes the temporary data with the stale data and clears the stale indicator.

The described embodiments of the invention improve reliability of a network element. Providing intelligence to the processes of a network element enables processes to function efficiently as previously stated. In addition, intelligence about other processes enables processes of a network element to function independently despite failures without interrupting service. Each process can use stored data from other processes to facilitate processing and/or transmission of traffic even though other processes are dead. Knowledge of other process' states also enable processes to determine how long data can be used and if the data can be refreshed.

The described network elements include line cards and control cards executing the described processes. The line cards and control cards of the network elements include memories, processors, and/or Application Specific Integrated Circuits ("ASICs"). Such memory includes a machine-readable medium on which is stored a set of instructions (i.e., software) embodying anyone, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, and flash memory devices.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method implemented in a network element to support inter-process communication, the network element including a plurality of processor running different operating systems, the method comprising the steps of:
registering a first process executed by a first processor running a first operating system with a process state manager to obtain a first communication key for the first process;
sending to a process state manager a look-up request from the first process to obtain a second communication key to communicate with a second process executed by a second processor running a second operating system;

initiating communication with the second process by the first process using the communication key;

receiving by the first process a first set of data from the second process;

receiving a notification of death of the second network process from the process state manager, the notification indicating that the second process has been determined by the process state manager to have died;

marking the first set of data with a stale indicator immediately upon receipt of the notification that indicated that the second process is dead;

clearing the first set of data by the first process if a time period expires, the time period beginning upon receiving the notification of death of the second process from the process state manager; and synchronizing by the first process the first set of data with a second set of data received from the second process and clearing the stale indicator, if the time period does not expire, the second set of data received from the second process after the first network process restarts.

2. The method of claim 1 further comprising the step of:
determining the second process has died by the process state manager polling the second operating system of the second process.

3. The method of claim 1 wherein the first set of data and the second set of data are synchronized after a done signal is received.

4. The method of claim 1 further comprising the step of:
restoring a set of configurations to the second process after the second process restarts.

5. The method of claim 1 further comprising clearing the second set of data if the time period expires and a done signal is not received.

6. The method of claim 1, further comprising the step of:
determining the second process has died by the process state manager timing out the second process after failure to receive a heartbeat signal from the second process or the second operating system.

7. A network element to support inter-process communication, the network element comprising:
a first processor configured to run a first operating system, the first processor executing a first process; and
a second processor configured to run a second operating system, the second processor executing a second process; and
a third processor configured to execute a process state manager,
the first process configured to request from the process state manager a first communication key for the first process, to send to the process state manager a look-up request to obtain a second communication key to communicate with the second process, to initiate communication with the second process using the communication key, to receive by the first process a first set of data from the second process; to receive a notification of death of the second network process from the process state manager, the notification indicating that the second process has been determined by the process state manager to have died, the first process to mark the first set of data with a stale indicator immediately upon receipt of the notification that indicated that the second process is dead, to clear the first set of data by the first process if a time period expires, the time period beginning upon receiving the notification of death of the second process from the process state manager, and the first process to synchronize the first set of data with a second set of data received from the second process and to clear the stale indicator, if the time period does not expire, the second set of data received from the second process after the first network process restarts.

8. The network element of claim 7, wherein the process state manager is configured to determining the second process has died polling the second operating system of the second process.

9. The network element of claim 7 wherein the first set of data and the second set of data are synchronized after a done signal is received.

10. The network element of claim 7 further comprising:
a configuration manager to restore a set of configurations to the second process after the second process restarts.

11. The network element of claim 7, wherein the first process is further configured to clear the second set of data if the time period expires and a done signal is not received.

12. The network element of claim 7, wherein the process state manager is further configured to determine the second process has died by timing out the second process after failure to receive a heartbeat signal from the second process or the second operating system.

* * * * *

UNITED STATES PATENT AND TRADEMARK OFFICE
CERTIFICATE OF CORRECTION

| | | |
|---|---|---|
| PATENT NO. | : 8,423,674 B2 | Page 1 of 1 |
| APPLICATION NO. | : 09/872920 | |
| DATED | : April 16, 2013 | |
| INVENTOR(S) | : Chandra et al. | |

It is certified that error appears in the above-identified patent and that said Letters Patent is hereby corrected as shown below:

In the Drawings

In Fig. 3, Sheet 3 of 15, for Tag "307", in Line 1, delete "HEARBEAT" and insert -- HEARTBEAT --, therefor.

In the Specifications

In Column 7, Line 23, delete "the to" and insert -- to the --, therefor.

In Column 8, Line 60, in Claim 1, delete "processor" and insert -- processors --, therefor.

Signed and Sealed this
Fifth Day of November, 2013

Teresa Stanek Rea
*Deputy Director of the United States Patent and Trademark Office*